US012722645B2

(12) United States Patent
Uto et al.

(10) Patent No.: US 12,722,645 B2
(45) Date of Patent: Sep. 1, 2026

(54) BEHAVIOR ESTIMATION DEVICE AND BEHAVIOR ESTIMATION METHOD FOR SADDLE-TYPE VEHICLE

(71) Applicant: KAWASAKI MOTORS, LTD., Akashi (JP)

(72) Inventors: Yuki Uto, Hyogo (JP); Taichi Inaba, Hyogo (JP); Hisato Tokunaga, Hyogo (JP); Takayuki Higashi, Hyogo (JP)

(73) Assignee: KAWASAKI MOTORS, LTD., Akashi (JP)

(*) Notice: Subject to any disclaimer, the term of this patent is extended or adjusted under 35 U.S.C. 154(b) by 68 days.

(21) Appl. No.: 18/889,884

(22) Filed: Sep. 19, 2024

(65) Prior Publication Data

US 2025/0091590 A1 Mar. 20, 2025

(30) Foreign Application Priority Data

Sep. 19, 2023 (JP) ................................ 2023-150656

(51) Int. Cl.
*B60W 40/12* (2012.01)
*G01S 19/14* (2010.01)

(52) U.S. Cl.
CPC ............ *B60W 40/12* (2013.01); *G01S 19/14* (2013.01); *B60W 2300/36* (2013.01); *B60W 2510/0638* (2013.01)

(58) Field of Classification Search
CPC ............ B60W 40/12; B60W 2300/36; B60W 2510/0638; B60W 2520/10; B60W 2556/50; B60W 40/10; B60W 2050/146; B60W 50/14; B62J 45/415; B62M 7/02; B62M 7/12; B62K 5/027; B62K 2202/00; B60L 2200/12; B60L 2240/16;
(Continued)

(56) References Cited

U.S. PATENT DOCUMENTS

2013/0041522 A1* 2/2013 Mori .................... G07C 5/0808 701/1
2016/0009275 A1* 1/2016 Hieda .................. B60T 8/1706 701/70
2017/0101008 A1* 4/2017 Hirokami .............. B60K 28/14
(Continued)

FOREIGN PATENT DOCUMENTS

JP 2019-064469 A 4/2019
WO WO-2023053270 A1 * 4/2023 ........... B62J 45/415

*Primary Examiner* — Adnan Aziz
(74) *Attorney, Agent, or Firm* — PROCOPIO, CORY, HARGREAVES & SAVITCH LLP

(57) ABSTRACT

There is provided a behavior estimation device and a behavior estimation method for analyzing a behavior of a saddle-type vehicle including a vehicle body, a drive source, and a grounded traveling body. The behavior estimation device includes: a receiving device that receives an output instruction value of the drive source by a driver and a rotational speed of the drive source, the output instruction value and the rotational speed being detected by a sensor provided in the saddle-type vehicle during traveling of the saddle-type vehicle; and a processing device that estimates whether the grounded traveling body is in a grounded state in which the grounded traveling body is in contact with a road surface or in a jump state in which the grounded traveling body is separated from the road surface based on the output instruction value and the rotational speed received.

17 Claims, 6 Drawing Sheets

(58) Field of Classification Search
CPC ........... B60L 2240/20; B60L 2240/421; B60L 2240/461; G01S 19/14
See application file for complete search history.

(56) References Cited

U.S. PATENT DOCUMENTS

| | | | | |
|---|---|---|---|---|
| 2018/0257740 | A1* | 9/2018 | Kikkawa | B62B 5/0073 |
| 2020/0012964 | A1* | 1/2020 | Shimazu | B62J 50/20 |
| 2021/0019960 | A1* | 1/2021 | Matsuda | G07C 5/0808 |
| 2021/0269016 | A1* | 9/2021 | Hattori | B60W 10/188 |
| 2023/0083770 | A1* | 3/2023 | Kurotobi | B62J 45/41 701/2 |
| 2024/0335758 | A1* | 10/2024 | Adams | A63H 30/04 |
| 2025/0171099 | A1* | 5/2025 | Tanaka | B60W 30/18145 |

* cited by examiner

BEHAVIOR ESTIMATION DEVICE AND BEHAVIOR ESTIMATION METHOD FOR SADDLE-TYPE VEHICLE

CROSS-REFERENCE TO RELATED APPLICATIONS

This application is based on and claims priority under 35 USC 119 from Japanese Patent Application No. 2023-150656 filed on Sep. 19, 2023, the contents of which are incorporated herein by reference.

TECHNICAL FIELD

The present disclosure relates to a device or method for analyzing a behavior of a saddle-type vehicle.

BACKGROUND ART

JP2019-064469A describes a posture estimation device that estimates a posture of a motorcycle, which is one of saddle-type vehicles.

Specifically, a sensor such as a GPS antenna or an IMU is disposed in each of a frame, a front fork, and a swing arm of the motorcycle.

SUMMARY OF INVENTION

According to a first aspect of the present disclosure, a behavior estimation device is configured to analyze a behavior of a saddle-type vehicle including a vehicle body, a drive source, and a grounded traveling body configured to travel using a driving force generated by the drive source.

The behavior estimation device includes: a receiving device configured to receive an output instruction value of the drive source by a driver and a rotational speed of the drive source, the output instruction value and the rotational speed being detected by a sensor provided in the saddle-type vehicle during traveling of the saddle-type vehicle; and a processing device configured to estimate whether the grounded traveling body is in a grounded state in which the grounded traveling body is in contact with a road surface or in a jump state in which the grounded traveling body is separated from the road surface based on the output instruction value and the rotational speed received by the receiving device.

According to a second aspect of the present disclosure, a behavior estimation method is capable of analyzing a behavior of a saddle-type vehicle including a vehicle body, a drive source, and a grounded traveling body that is in contact with a road surface and travels by a driving force generated by the drive source.

The behavior estimation method includes: receiving a behavior instruction value by a driver, the behavior instruction value being detected by a sensor during the traveling of the saddle-type vehicle; and estimating whether the grounded traveling body is in a grounded state in which the grounded traveling body is in contact with the road surface or in a jump state in which the grounded traveling body is separated from the road surface based on the received behavior instruction value.

DESCRIPTION OF EMBODIMENTS

Next, embodiments of the present application will be described with reference to the drawings.

Figure 1:
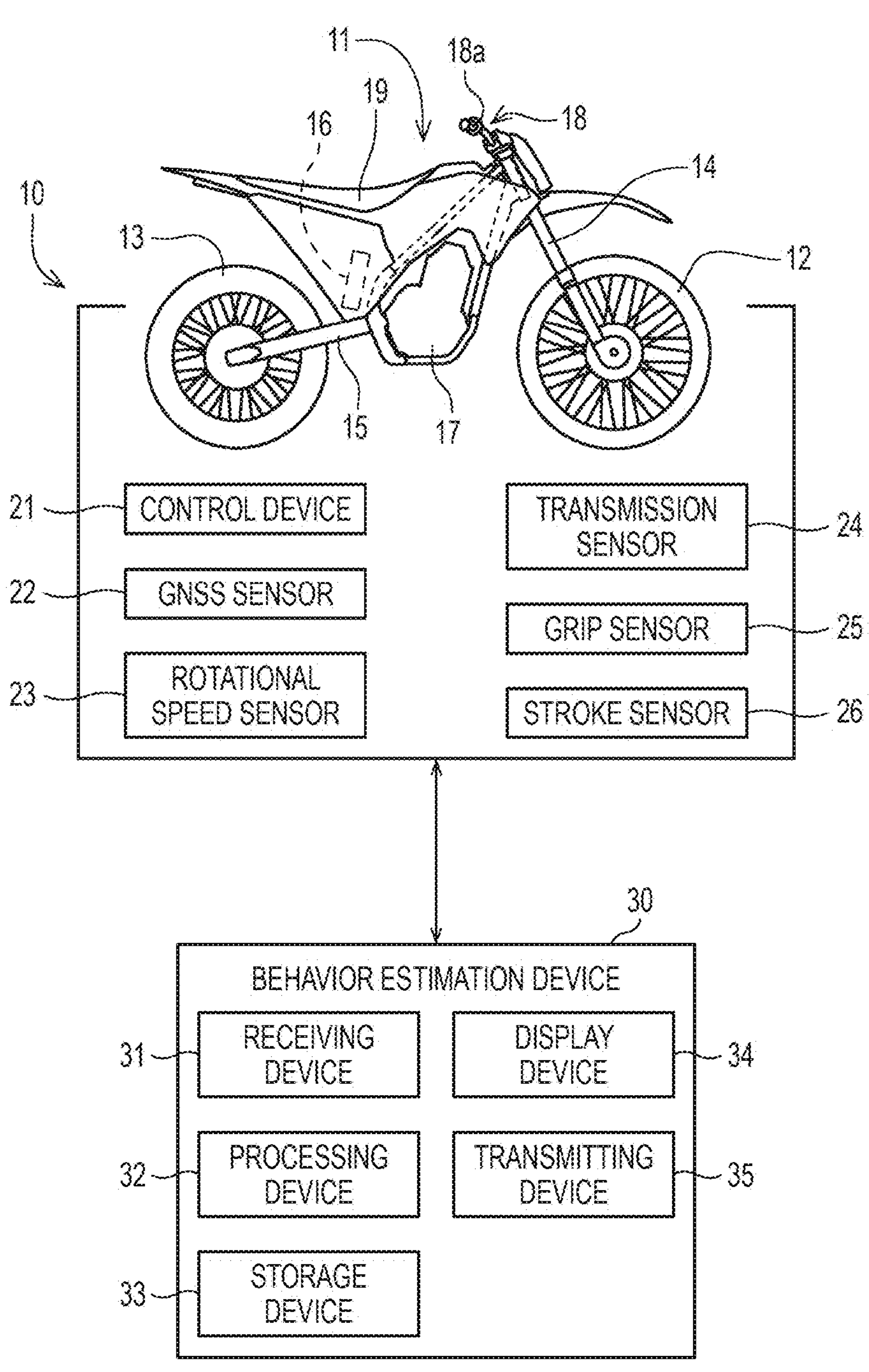
FIG. 1 is a block diagram of a motorcycle and a behavior estimation device.

FIG. 1 is a block diagram of a motorcycle 10 and a behavior estimation device 30.

Figure 2:
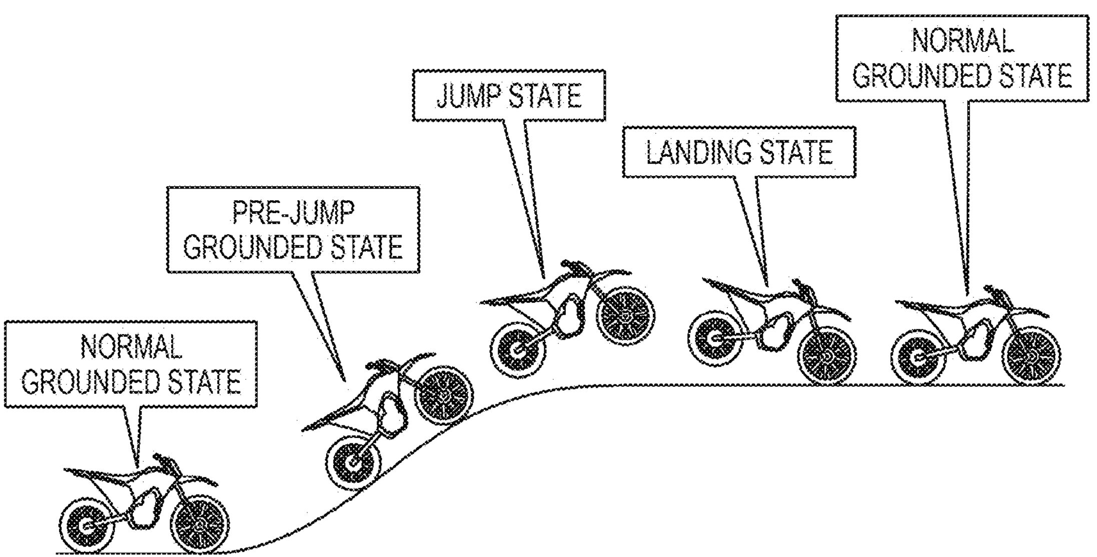
FIG. 2 is a diagram illustrating a state of the motorcycle.

The motorcycle 10 is one of saddle-type vehicles. The motorcycle 10 is a type of vehicle that mainly travels on an unpaved road. In particular, the motorcycle 10 is used in a race on the unpaved road. In this type of race, there is an upward slope as illustrated in FIG. 2, and a driver may cause the motorcycle 10 to jump at the end of the upward slope. In addition, the driver may cause the motorcycle 10 to jump on a portion connecting from a flat road to a downward slope or a portion having large unevenness.

The behavior estimation device 30 estimates a behavior of the motorcycle 10 based on a detection value of a sensor provided in the motorcycle 10. Specifically, the behavior estimation device 30 estimates whether the motorcycle 10 is in a grounded state or a jump state. The grounded state is a state in which at least one of a front wheel 12 and a rear wheel 13 of the motorcycle 10 is in contact with a road surface. The jump state is a state in which both the front wheel 12 and the rear wheel 13 of the motorcycle 10 are separated from the road surface.

The behavior estimation device 30 of the present embodiment is the motorcycle 10 used in a race on an unpaved road. However, the behavior estimation device 30 can be applied to a motorcycle mainly traveling on a paved road or a motorcycle capable of traveling not only in a race but also on a public road. In addition, the behavior estimation device 30 can be applied not only to a motorcycle but also to a vehicle having three or more wheels, a snowmobile, and the like.

Hereinafter, detailed configurations of the motorcycle 10 and the behavior estimation device 30 will be described.

The motorcycle 10 includes a vehicle body 11, the front wheel 12, and the rear wheel 13. The vehicle body 11 includes a vehicle body frame and a cowl. The cowl may be omitted. The front wheel 12 is attached to the vehicle body 11 via a front fork 14. The front fork 14 is of a telescopic type and has a front suspension function. The front wheel 12 is attached to the vehicle body 11 via a swing arm 15. The swing arm 15 is swingable with respect to the vehicle body 11. A rear suspension 16 is provided between the vehicle body 11 and the swing arm 15, and the vibration of the rear wheel 13 is reduced by the rear suspension 16 and transmitted to the vehicle body 11.

An engine 17 is attached to the vehicle body 11. The engine 17 generates a driving force using fuel such as gasoline, light oil, or gaseous fuel. The driving force generated by the engine 17 is decelerated by a transmission device provided integrally with the engine 17, and is transmitted to the rear wheel 13, which is a driving wheel. The engine 17 corresponds to a drive source. The drive source is not limited to the engine, and may be an electric motor. In addition, both the engine and the electric motor may be provided. In this case, both the engine and the electric motor correspond to drive sources.

The front wheel 12 and the rear wheel 13 correspond to grounded traveling bodies. The grounded traveling body is a portion that is in contact with the road surface and travels using the driving force generated by the drive source such as the engine 17. The rear wheel 13 is rotationally driven by the driving force generated by the engine 17 to travel. The front wheel 12 rotates and travels in a driven manner as the rear wheel 13 is rotationally driven. In this way, the front wheel 12 and the rear wheel 13 are portions that travel using the driving force. The grounded traveling body is not limited to the wheel, and may be a crawler. For example, when the saddle-type vehicle is a snowmobile, the crawler corresponds to the grounded traveling body. In other words, the grounded traveling body is a road surface engagement member or a road surface contact member.

The motorcycle 10 further includes a steering handle 18 and a seat 19. The steering handle 18 is a portion that is operated by the driver while the motorcycle 10 is traveling. For example, the motorcycle 10 can be turned by the driver rotating the steering handle 18 about a steering shaft. In addition, a right grip of the steering handle 18 is a throttle grip 18*a*. When the driver rotates the throttle grip 18*a* in a predetermined direction about an axial direction, an amount of fuel supplied to the engine 17 increases, and the motorcycle 10 can be accelerated. That is, the throttle grip 18*a* is an operating element for instructing a change in output of the drive source. An accelerator pedal or an accelerator lever may be provided instead of the throttle grip 18*a*. The seat 19 is a portion on which the driver sits. The seat 19 has a narrow width, and the driver sits on the seat 19 so as to straddle the seat 19. Therefore, the motorcycle 10 corresponds to a saddle-type vehicle.

As illustrated in FIG. 1, the motorcycle 10 is provided with a control device 21 and various sensors. The control device 21 includes a calculation device such as a CPU, a nonvolatile memory such as an SSD or a flash memory, a main memory such as a RAM, and a communication device capable of short-range wireless communication. During the traveling of the motorcycle 10, sensor values detected by the sensors are input to the control device 21. The control device 21 stores the input sensor values in the nonvolatile memory. The control device 21 transmits the sensor values to the behavior estimation device 30 using the communication device during the traveling of the motorcycle 10. It is not essential to transmit the sensor values to the behavior estimation device 30 during the traveling of the motorcycle 10, and the sensor values stored in the nonvolatile memory may be transmitted to the behavior estimation device 30 after the traveling of the motorcycle 10 is completed. Specifically, the sensor values may be transmitted from the control device 21 to the behavior estimation device 30 by wired communication or wireless communication, or the sensor values may be read by detaching the nonvolatile memory from the control device 21 and attaching the nonvolatile memory to the behavior estimation device 30.

The sensors provided in the motorcycle 10 include a GNSS sensor 22, a rotational speed sensor 23, a transmission sensor 24, a grip sensor 25, and a stroke sensor 26. The GNSS sensor 22 includes a GNSS antenna and a GNSS receiver. The GNSS receiver performs a positioning calculation based on a positioning signal received by the GNSS antenna and calculates position information indicating an absolute position of the GNSS receiver. The rotational speed sensor 23 detects a rotational speed of the engine 17. The transmission sensor 24 is a sensor that detects a gear position indicating the number of stages of the transmission device. The grip sensor 25 detects a rotation angle of the throttle grip 18*a*, in other words, an output instruction value for the engine 17. The stroke sensor 26 detects a stroke of the suspension. The stroke sensor 26 may detect only the front fork 14, only the rear suspension 16, or both the front fork 14 and the rear suspension 16.

These sensor values are acquired at a predetermined sampling rate and stored in the control device 21 in association with an acquisition time. That is, time-series data of the sensor values is stored in the control device 21. The time-series data is data associated with information indicating a timing such as time. Therefore, for example, a number string or a character string indicating a timing may be used instead of the time. In addition, if a measurement start timing and a sampling rate are the same for a plurality of types of sensor values, data obtained by simply arranging the plurality of types of sensor values in order also corresponds to the time-series data. In addition, these sensors are well-known sensors provided in a general motorcycle 10 in advance. Therefore, the description of positions at which the sensors are provided and a detection principle of the sensor value will be omitted.

The control device 21 calculates a vehicle speed and a front-rear acceleration based on time-series data of the position information. Based on the time-series data of the position information, the vehicle speed can be calculated by specifying a distance that the motorcycle 10 has moved for a predetermined time. The vehicle speed thus calculated can also be measured when the motorcycle 10 is in the jump state. The front-rear acceleration is an acceleration of the motorcycle 10 in a front-rear direction. The front-rear acceleration can be calculated by calculating a temporal change of the vehicle speed. Instead of the method of calculating the vehicle speed and the front-rear acceleration using the position information, the vehicle speed and the front-rear acceleration may be calculated using a vehicle speed sensor or an acceleration sensor.

The behavior estimation device 30 is a computer including a receiving device 31, a processing device 32, a storage device 33, a display device 34, and a transmitting device 35.

The receiving device 31 receives the sensor values from the control device 21. Therefore, when the control device 21 transmits the sensor values using the short-range wireless communication, the receiving device 31 is a wireless communication module. In addition, when the control device 21 transmits the sensor values by wire, the receiving device 31 is a wired communication module. When the nonvolatile memory is detached from the control device 21 and attached to the behavior estimation device 30, the receiving device 31 is a reading device.

The processing device 32 is a calculation device such as a CPU. The processing device 32 can execute various processing by reading a program into the main memory and executing the same. For example, the processing device 32 performs the above-described processing of estimating whether the motorcycle 10 is in the grounded state or the jump state.

The storage device 33 is a nonvolatile memory such as an HDD, an SSD, or a flash memory, and stores the above-described program or control data. In addition, the sensor value received by the receiving device 31 is stored in the storage device 33.

The display device 34 is a liquid crystal or organic EL display, and can display various information. The display device 34 is not an essential component and may be omitted.

The transmitting device 35 transmits an estimation result of the processing device 32 to an external device. The external device is, for example, a smartphone, a tablet terminal, or a PC of the driver. Alternatively, the external device may be a server managed by a company that operates the behavior estimation device 30. The transmitting device 35 communicates with the external device using the Internet, the short-range wireless communication, or the like. When communication methods used in the receiving device 31 and the transmitting device 35 are the same as each other, one module serves as the receiving device 31 and the transmitting device 35. The transmitting device 35 is not an essential component and may be omitted.

Next, a state of the motorcycle 10 will be described with reference to FIG. 2. As described above, the state of the motorcycle 10 is divided into the jump state and the grounded state. The definition of the jump state and the grounded state is as described above, and may be defined from another viewpoint. For example, in the jump state, it is difficult for an own weight of the vehicle to act on the suspension, and thus the suspension becomes extended. Therefore, a case in which the stroke of the suspension detected by the stroke sensor is larger than a predetermined value may be defined as the jump state, and other cases may be defined as the grounded state. In addition, the grounded state is further divided into a pre-jump grounded state, a landing state, and a normal grounded state.

The pre-jump grounded state is a state in the middle of transitioning to the jump state. For example, a moment of a predetermined second before the transition to the jump state may be set as a start timing of the pre-jump grounded state, a moment at which a specific operation is performed when the transition to the jump state is made may be set as a start timing of the pre-jump grounded state, a moment at which the front wheel 12 is separated from the road surface when the transition to the jump state is made may be set as a start timing of the pre-jump grounded state, or a moment at which a change of the suspension when the transition to the jump state is made is started may be set as a start timing of the pre-jump grounded state.

The landing state is a state when the motorcycle 10 lands from the jump state. For example, the landing state is a state until a predetermined second elapses from a moment when the motorcycle 10 transitions from the jump state to the grounded state as a start timing. Alternatively, the landing state may be a state until both of the wheels are in contact with the road surface from a moment when one of the wheels is in contact with the road surface as a start timing. Alternatively, the landing state may be a state until the fluctuation of the suspension when the motorcycle 10 lands from the jump state is equal to or less than a threshold value.

The normal grounded state is a state other than the pre-jump grounded state and the landing state among the grounded states. It is not essential to further divide the grounded state into three categories. In addition, the classification of the state of the motorcycle 10 of the present embodiment is an example. Therefore, the jump state may be divided into a plurality of states. For example, the jump state may be divided into a small jump state and a large jump state in accordance with a duration or a flight distance of the jump state.

In the present embodiment, as a preliminary preparation, an estimation model is created by performing machine learning on time-series data of sensor values for training. At the time of operation, time-series data of sensor values for determination is input to the estimation model, whereby the estimation model outputs an estimation result of the state of the motorcycle 10.

Here, the basis for estimating the state of the motorcycle 10 using the sensor values of the present embodiment will be described. The driver sets an output instruction value to a very large value for jump immediately before the jump. Thereafter, the driver significantly decreases the output instruction value for posture control of the motorcycle 10 in the jump state. Specifically, the driver often decreases the output instruction value to 0 in the jump state. At the time of landing, the driver often sets the output instruction value to a maximum or very large value for impact reduction. In this way, the output instruction value shows a characteristic change before and after the jump. Therefore, when the output instruction value indicates such a characteristic change, it is determined to be the jump state, and the other states can be estimated to be the grounded state.

In this way, it is also possible to estimate whether the motorcycle 10 is in the jump state or the grounded state based on only the output instruction value, and in order to improve an estimation accuracy, it is preferable to use, for example, an engine rotational speed. There is a correlation between the output instruction value and the engine rotational speed, and the engine rotational speed becomes higher by increasing the output instruction value. However, when the motorcycle 10 is in the jump state, a load of the engine 17 is small as compared with a case in which the motorcycle 10 is in the grounded state, and different correlations are exhibited. That is, it is also possible to estimate whether the motorcycle 10 is in the jump state or the grounded state by analyzing the correlation between the output instruction value and the engine rotational speed. As described above, the estimation accuracy can be improved by using the output instruction value and the engine rotational speed.

An ideal gear position immediately before the jump may be different from an ideal gear position immediately after the landing. In this case, the driver changes the gear position in the jump state. It is not necessary to obtain a propulsion force from the road surface via the rear wheel 13 in the jump state, and thus the operation of changing the gear position may be different from an operation of changing the gear position when the motorcycle 10 is in the grounded state. Therefore, there is a possibility that the estimation accuracy can be further improved by using the gear position.

When the motorcycle 10 is in the grounded state, a propulsion force is obtained from the road surface via the rear wheel 13, and thus if the engine rotational speed and the gear position are known, the vehicle speed can be estimated to a certain degree of accuracy. In addition, if the time-series data of the engine rotational speed and the time-series data of the gear position are known, the front-rear acceleration can be estimated to a certain degree of accuracy. However, when the motorcycle 10 is in the jump state, no propulsion force is obtained via the rear wheel 13, and thus there is a possibility that the vehicle speed or the front-rear acceleration estimated based on the engine rotational speed and the gear position is greatly different from an actual vehicle speed or an actual front-rear acceleration. Therefore, the estimation accuracy can be further improved by using the vehicle speed or the front-rear acceleration. When the motorcycle 10 is in the grounded state, the vehicle speed is likely to decrease due to resistance from the road surface, and when the motorcycle 10 is in the jump state, the vehicle speed is less likely to decrease because there is no resistance from the road surface. Therefore, in consideration of this point, a manner in which the vehicle speed or the front-rear acceleration changes differs depending on whether the motorcycle 10 is in the grounded state or the jump state. Therefore, from this viewpoint, the estimation accuracy can also be improved by using the vehicle speed or the front-rear acceleration.

The types of sensor values described above are examples, and some types of sensor values may be omitted. For example, the output instruction value is an important value in relation to the estimation of the state of the motorcycle 10, and thus it is preferable to include the output instruction value. In addition, when the estimation accuracy is low by using only the output instruction value, it is preferable to further include, for example, the engine rotational speed. Instead of or in addition to the engine rotational speed, a gear position may be added, a vehicle speed may be added, or a front-rear acceleration may be added.

In the jump state, the driver may perform a brake operation to decrease a rotational speed of the front wheel 12 and the rear wheel 13 and to perform the posture control of the vehicle. The brake operation at this time is intended for posture control, and thus the brake operation intended for posture control is significantly different from a brake operation intended for braking. Therefore, it is possible to detect whether the motorcycle 10 is in the grounded state or the jump state based on the brake operation. In this case, it is necessary to provide a sensor for detecting an operation amount of a brake lever or a brake pedal. In addition, a sensor value of the sensor for the brake lever or the brake pedal corresponds to a behavior instruction value. In addition, the above-described output instruction value also corresponds to the behavior instruction value.

The above-described sensor value may indicate a characteristic change, and thus it is preferable to estimate the state of the motorcycle 10 using time-series data of the sensor values in order to detect the change. In other words, in order to estimate a state at a time T1, it is preferable to estimate the state of motorcycle 10 using a sensor value before the time T1 and a sensor value after the time T1. That is, it is preferable to estimate the state of the motorcycle 10 using a temporal change of the sensor values. However, it is not essential to use the time-series data of the sensor values or the temporal change of the sensor values. For example, in the jump state, a combination of the output instruction value and the engine rotational speed or a combination of other sensor values may indicate a characteristic value, and when the characteristic combination occurs, the state can be estimated as the jump state, and other states can be estimated as the grounded state.

As described above, there is a sufficient correlation between the sensor values and the state of motorcycle 10 of the present embodiment, and the state of the motorcycle 10 can be estimated based on the sensor values.

Next, a specific estimation processing will be described. First, processing of creating an estimation model will be described.

Figure 3:
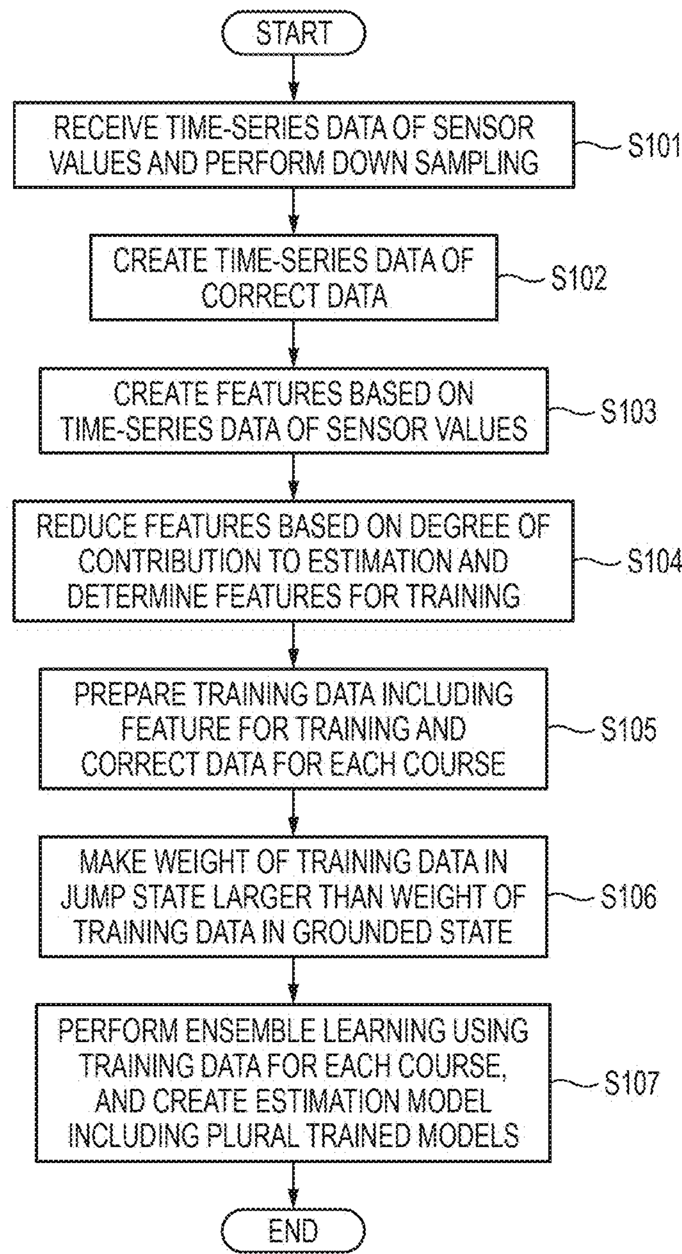
FIG. 3 is a flowchart relating to creation of an estimation model.

In the present embodiment, the processing device 32 of the behavior estimation device 30 creates an estimation model by performing processing of a flowchart of FIG. 3. The processing of FIG. 3 may be spontaneously performed by the processing device 32 or may be performed by the processing device 32 in response to a command from a person. At least a part of the processing of creating an estimation model may be performed using another computer.

First, the time-series data of the sensor values for training is prepared. Specifically, the driver rides on the motorcycle 10 and performs test traveling on an unpaved road course, the time-series data of the sensor values detected by the sensors during the test traveling of the motorcycle 10 is acquired. The processing device 32 receives the time-series data of the sensor values (S101). In addition, when the sampling rate differs for each sensor value, the processing device 32 performs down sampling so as to match a lowest sampling rate or a predetermined sampling rate (S101).

Next, the processing device 32 creates time-series data of correct data (S102). The correct data is data indicating which state of the four states the motorcycle 10 is in the test traveling. The correct data is data indicating a correct answer at the time of training, and thus it is referred to as correct data. There are various methods of creating correct data. For example, a person may determine which state is based on a moving image obtained by photographing the test traveling of the motorcycle 10 with a camera, and input the state to the processing device 32 to create correct data. In addition, the processing device 32 may determine which state is based on a detection result of the stroke sensor 26 or another sensor to create correct data. In this case, the other sensor is a sensor that detects a behavior of the motorcycle 10, and is, for example, a sensor not provided in a mass-produced motorcycle 10 or a sensor provided outside the motorcycle 10.

Next, the processing device 32 creates features based on the time-series data of the sensor values (S103). By using a well-known library, the time-series data of the sensor values can be converted to create features. Specifically, libraries such as tsfresh and hctsa can be used. For example, a maximum value, a minimum value, or an average value of sensor values in a predetermined time length may be created as a feature, or the number of times of taking an extreme value in the predetermined time length may be created as a feature. The processing of creating a feature may use a plurality of libraries or may not use the libraries. In addition, the sensor values may be treated as features without performing the processing of creating a feature. In other words, the processing of step S103 is not essential and can be omitted.

Next, the processing device 32 reduces the features based on a degree of contribution to estimation and determines features for training (S104). A useful feature can be extracted by creating a large number of features in the processing of step S103 and reducing features having a low priority in the processing of step S104. Specifically, the features are reduced using SHAP. The SHAP is a well-known framework for interpreting a predicted value by a complicated model, and calculates and compares SHAP values indicating a degree of contribution to estimation. Accordingly, it is possible to reduce features having a small degree of contribution to estimation. The features may be reduced by using a method other than SHAP. The processing of step S104 is not essential and may be omitted.

As described above, the training data including the feature for training and the correct data can be prepared. The training data corresponds to training data for supervised learning. In addition, in the present embodiment, test traveling is performed on a plurality of courses to prepare time-series data of the sensor values. Therefore, the processing device 32 performs the above-described processing for each course to prepare training data (S105). The learning may be performed using only the training data of one course.

During the test traveling, a time during which the motorcycle 10 is in the jump state is often significantly shorter than a time during which the motorcycle 10 is in the grounded state. Therefore, the training data is biased. Therefore, in order to reduce an influence of the bias, the processing device 32 makes a weight of training data in the jump state larger than a weight of training data in the grounded state (S106). Alternatively, the processing device 32 may reduce the influence of the bias by thinning out the training data in the grounded state. That is, the processing device 32 performs processing such that the training data in the jump state has a higher training priority than the training data in the grounded state.

Next, the processing device 32 performs ensemble learning using the training data for each course, and creates an estimation model including a plurality of trained models (S107). That is, one trained model is created using training data obtained in one course. As the machine learning, GBDT-based machine learning, for example, Catboost may be used, and other methods may be used. A high classification accuracy can be expected by using the GBDT-based machine learning, and it is also possible to create a trained model having a sufficient estimation accuracy by using other methods. In the present embodiment, the input of the trained model is the time-series data of the features, and the output of the trained model is a degree of certainty for each state of the motorcycle 10. The degree of certainty is a degree of being estimated to belong to each state, the higher the degree of certainty, the higher a probability of belonging to the state. The ensemble learning is an example. Therefore, the processing device 32 may create an estimation model including one trained model.

Next, processing of estimating the state of the motorcycle 10 using the estimation model will be described.

Figure 4:
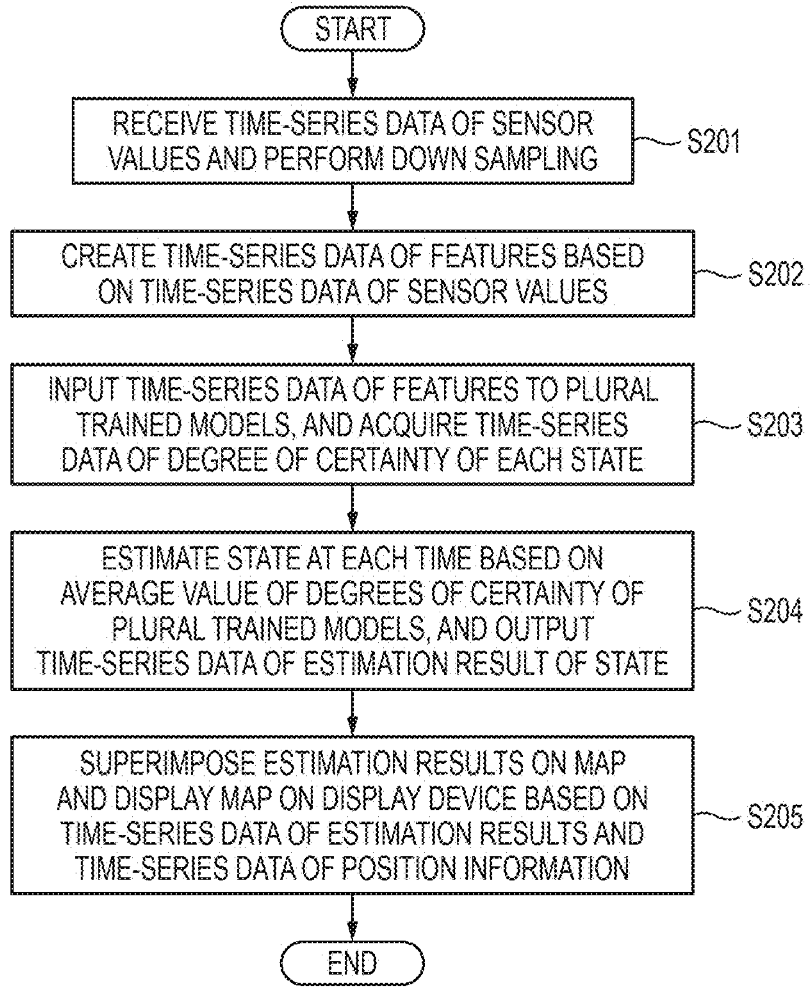
FIG. 4 is a flowchart of an estimation processing using the estimation model.
Figure 5:
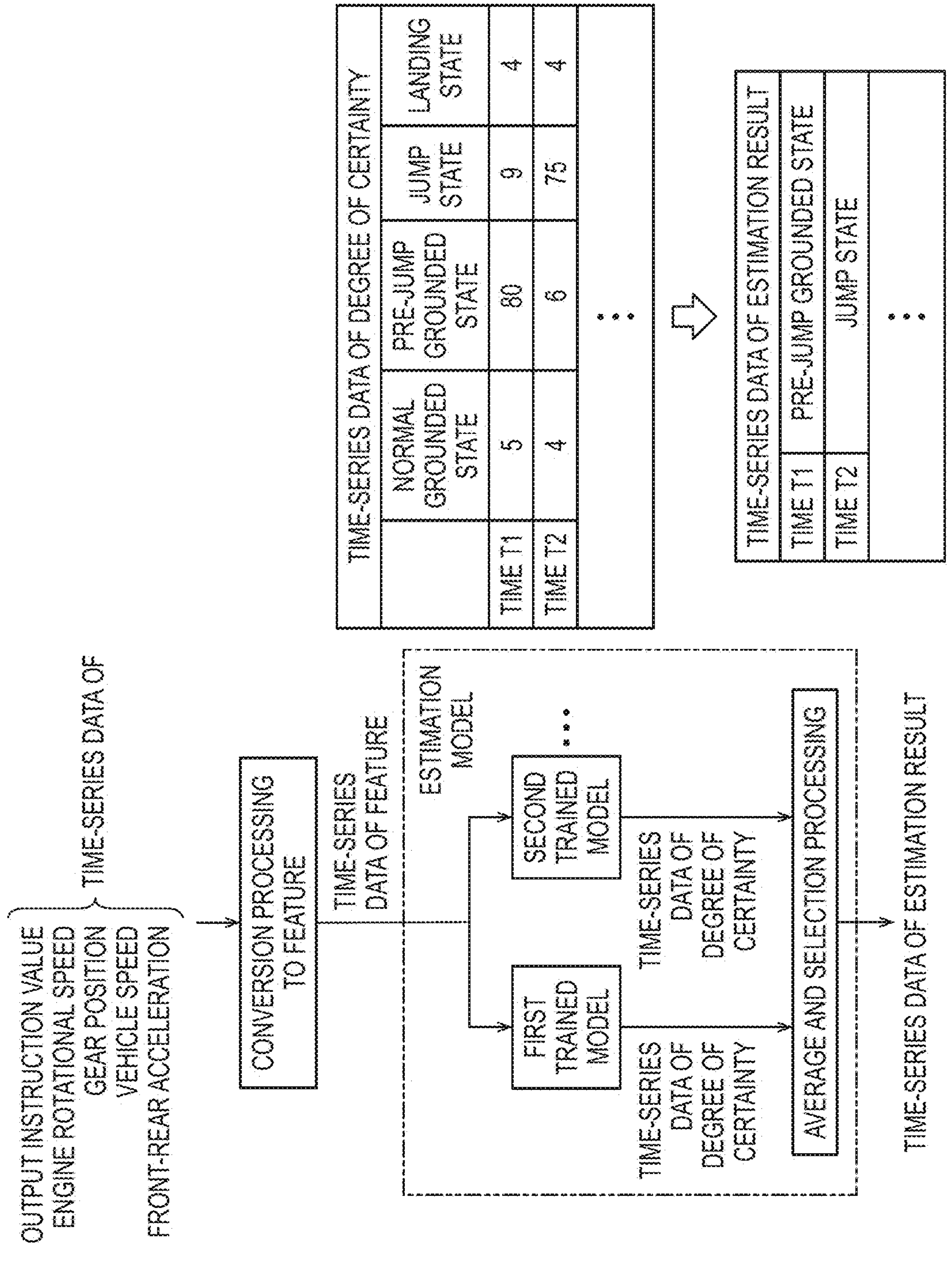
FIG. 5 is a diagram conceptually illustrating the estimation processing using the estimation model.

In the present embodiment, the processing device 32 of the behavior estimation device 30 estimates the state of the motorcycle 10 by performing processing of a flowchart of FIG. 4. FIG. 5 is a diagram illustrating the processing from the viewpoint of the flow of data.

When the estimation is performed, first, the time-series data of the sensor values to be estimated is prepared. Specifically, the driver rides on the motorcycle 10 and travels on an unpaved road course, the time-series data of the sensor values detected by the sensors during the traveling of the motorcycle 10 is acquired. The travel course may be the same as or different from a course at the time of creating an estimation model. This is because the state of the motorcycle 10 is estimated not based on a position or a shape of the course but based on the sensor values in the present embodiment, and thus the state of the motorcycle 10 can be estimated regardless of the position or the shape of the course. The processing device 32 receives the time-series data of the sensor values to be estimated (S201). In addition, as in the case of creating the estimation model, when the sampling rate differs for each sensor value, the processing device 32 performs down sampling so as to match a lowest sampling rate or a predetermined sampling rate (S201).

Next, the processing device 32 creates time-series data of features based on the time-series data of the sensor values (S202). The created features are the same as the features reduced in step S104, in other words, the features used in the machine learning. When the estimation model is created without creating the features, the processing of step S202 may be omitted.

Next, the processing device 32 inputs the time-series data of the features to the plurality of trained models, and acquires time-series data of a degree of certainty of each state (S203). For example, it is assumed that the trained models include a first trained model and a second trained model. The first trained model outputs the time-series data of the degree of certainty of the state of the motorcycle 10 in association with an acquisition time of the sensor value. For example, as illustrated in FIG. 5, a degree of certainty of each of the normal grounded state, the pre-jump grounded state, the jump state, and the landing state is output according to time.

Next, the processing device 32 estimates a state at each time based on an average value of the degrees of certainty of the plurality of trained models, and outputs time-series data of an estimation result of the state (S204). In the present embodiment, each of the plurality of trained models outputs a degree of certainty by the ensemble learning. Therefore, for example, when an estimation accuracy of one trained model is low, other trained models can also compensate for the estimation accuracy. In the present embodiment, the average value of the degrees of certainty is calculated, and a state having a largest average value is set as an estimation result. Alternatively, a state having a highest degree of certainty may be specified for each trained model without using the average value, and an estimation result may be determined by majority decision. In addition, when no ensemble learning is performed, the processing of step S204 is not necessary, and the state having a highest degree of certainty output by one trained model is determined as the estimation result.

Figure 6:
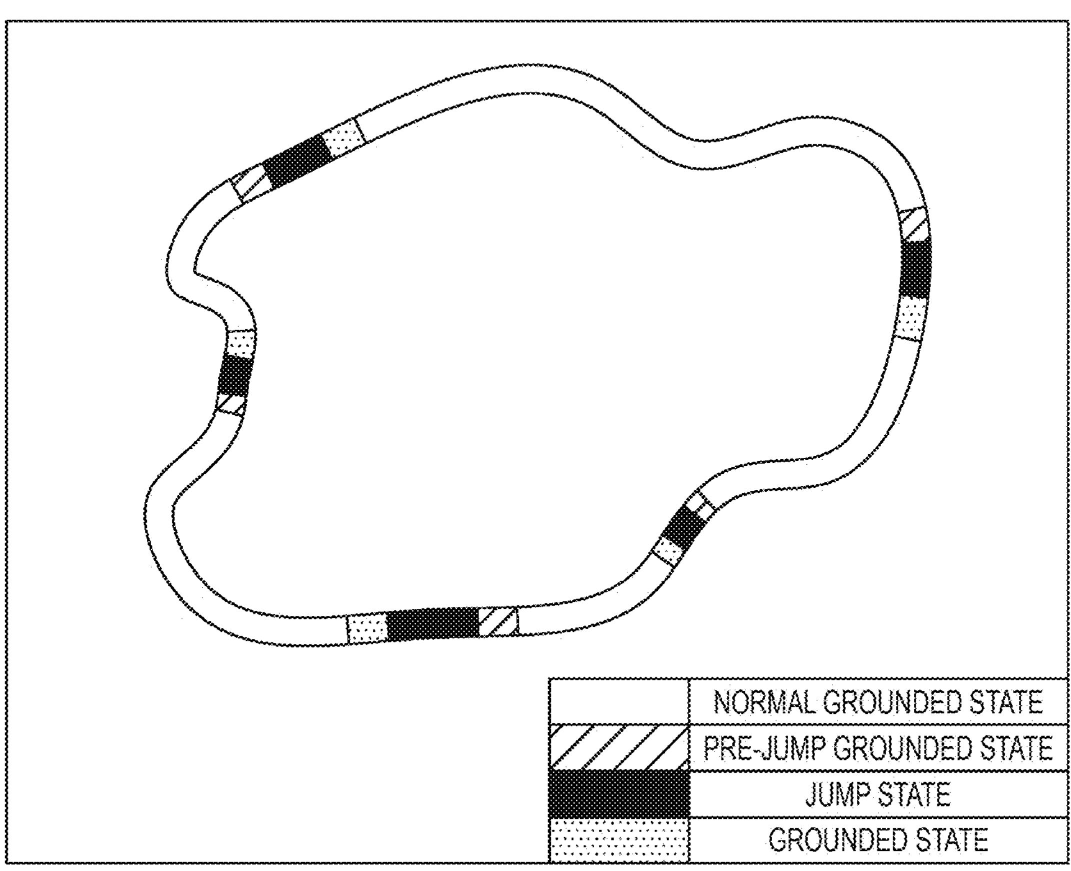
FIG. 6 is a diagram illustrating an image in which estimation results are superimposed on a map.

Next, the processing device 32 superimposes the estimation results on a map and displays the map on the display device 34 based on time-series data of the estimation results and time-series data of position information (S205). Specifically, it is possible to create data indicating correspondence between the estimation results and the position information by associating the time-series data of the estimation results with the time-series data of the position information using time. In addition, it is assumed that the behavior estimation device 30 stores position information on the map. As described above, the processing device 32 can superimpose the time-series data of the estimation results and the time-series data of the position information on the map as illustrated in FIG. 6. In the present embodiment, the processing device 32 is displayed on the display device 34, and may be displayed on an external device via the transmitting device 35.

(Feature 1) As described above, the behavior estimation device 30 of the present embodiment analyzes a behavior of the motorcycle 10. The motorcycle 10 includes the vehicle body 11, the engine 17, and the rear wheel 13 that travels using a driving force generated by the engine 17. The behavior estimation device 30 includes the receiving device 31 and the processing device 32. The receiving device 31 receives an output instruction value of the engine 17 by a driver and a rotational speed of the engine 17, which are detected by the sensor provided in the motorcycle 10 during the traveling of the motorcycle 10. The processing device 32 estimates whether the front wheel 12 and the rear wheel 13 are in a grounded state in which the front wheel 12 and the rear wheel 13 are in contact with a road surface or a jump state in which the front wheel 12 and the rear wheel 13 are separated from the road surface, based on the output instruction value and the rotational speed received by the receiving device 31.

It is possible to estimate whether the motorcycle 10 is in the grounded state or the jump state, and thus it is possible to grasp a detailed behavior during the traveling of the motorcycle 10. In particular, the general motorcycle 10 includes a sensor that detects an output instruction value and a rotational speed, and thus the behavior of the motorcycle 10 can be grasped in principle without providing a dedicated sensor.

(Feature 2) In the behavior estimation device 30 according to the present embodiment, the processing device 32 receives time-series data of the output instruction value and the rotational speed from the receiving device 31, and outputs time-series data of an estimation result indicating whether the motorcycle 10 is in the grounded state or the jump state.

The behavior of the motorcycle 10 can be estimated using not only an output instruction value and a rotational speed at a specific time point but also a temporal change in the output instruction value and the rotational speed, and thus an estimation accuracy can be improved. In addition, a temporal change in the behavior of the motorcycle 10 can be grasped.

(Feature 3) In the behavior estimation device 30 according to the present embodiment, the grounded state includes a pre-jump grounded state, a landing state, and a normal grounded state. The pre-jump grounded state indicates a state in which the front wheel 12 and the rear wheel 13 are in contact with the ground and are in the middle of transitioning to the jump state. The landing state indicates a state in which the front wheel 12 and the rear wheel 13 are in contact with the ground and land from the jump state. The normal grounded state indicates a state in which the front wheel 12 and the rear wheel 13 are in contact with the ground and that is other than the pre-jump grounded state and the landing state. The processing device 32 estimates which of the pre-jump grounded state, the landing state, the normal grounded state, and the jump state corresponds to.

The behavior of the motorcycle 10 can be grasped in more detail.

(Feature 4) In the behavior estimation device 30 according to the present embodiment, the processing device 32 further estimates whether the motorcycle 10 is in the grounded state or the jump state based on a vehicle speed and a front-rear acceleration, which are detected by the sensor provided in the motorcycle 10 during the traveling of the motorcycle 10.

Accordingly, the estimation accuracy of the behavior of the motorcycle 10 is improved.

(Feature 5) In the behavior estimation device 30 according to the present embodiment, the processing device 32 calculates a vehicle speed and a front-rear acceleration of the motorcycle 10 based on time-series data of position information of the motorcycle 10.

The vehicle speed and the front-rear acceleration in the jump state can be easily calculated by only using the time-series data of the position information.

(Feature 6) In the behavior estimation device 30 according to the present embodiment, the receiving device 31 receives the time-series data of the position information of the motorcycle 10 from a GNSS sensor 22 serving as the sensor.

The GNSS sensor 22 is a generally used sensor, and can calculate the position information, the vehicle speed, and the front-rear acceleration using this type of sensor.

(Feature 7) In the behavior estimation device 30 according to the present embodiment, the processing device 32 causes the display device 34 to display information in which an estimation result as to whether the motorcycle 10 is in the grounded state or the jump state is superimposed on a map based on the position information of the motorcycle 10 and the estimation result.

The behavior of the motorcycle 10 according to the position can be grasped at a glance.

(Feature 8) In the behavior estimation device 30 according to the present embodiment, the processing device 32 uses an estimation model in which the output instruction value and the rotational speed are input and an estimation result indicating whether the motorcycle 10 is in the grounded state or the jump state is output. The estimation model is created by learning a feature based on the output instruction value, a feature based on the rotational speed, and correct data indicating whether the motorcycle 10 is in the grounded state or the jump state in a case of a combination of the features as training data.

The estimation result is obtained based on a tendency indicating how the output instruction value and the rotational speed affect the behavior of the motorcycle 10, and thus a highly accurate estimation result can be obtained.

(Feature 9) In the behavior estimation device 30 according to the present embodiment, the processing device 32 receives time-series data of the output instruction value and the rotational speed from the receiving device 31. The processing device 32 performs processing of matching sampling rates of the output instruction value and the rotational speed by down-sampling the time-series data of at least one of the output instruction value and the rotational speed, and then inputs the processing result to the estimation model.

By performing down sampling, data can be handled at the same sampling rate.

(Feature 10) In the behavior estimation device 30 according to the present embodiment, the training data includes data detected when the motorcycle 10 travels along a plurality of traveling paths.

A highly accurate estimation model can be created by using the data of the plurality of traveling paths.

(Feature 11) In the behavior estimation device 30 according to the present embodiment, the motorcycle 10 as a saddle-type vehicle travels on an unpaved road.

The motorcycle 10 traveling on an unpaved road frequently jumps, and thus an effect of the present application can be effectively utilized.

Features 1 to 11 described above can be appropriately combined as long as no contradiction occurs. For example, at least one of Features 1 to N−1 can be appropriately combined with Feature N (N=1, 2, . . . , 11).

While preferred embodiments of the present application have been described above, the above configuration can be modified as follows, for example.

The estimation using the estimation model is not essential, and the state of the motorcycle 10 may be estimated without using the estimation model. In this case, the processing device 32 estimates the state of the motorcycle 10 based on an estimation rule. The estimation rule is a rule-based condition for estimating the state of the motorcycle 10. As described above, the sensor values, in particular, the output instruction value and the engine rotational speed indicate characteristic values or changes between the grounded state and the jump state. Therefore, these values or changes can be grasped using a threshold value of the sensor values and a threshold value of a differential value of the sensor values. Accordingly, the state of the motorcycle 10 can be estimated without using the estimation model. Furthermore, the output instruction value also indicates a characteristic value or change in the pre-jump grounded state and the landing state, and thus it is possible to estimate which of the four states the motorcycle 10 corresponds to by creating an estimation rule in the same manner.

The flowcharts shown in the above embodiments are examples, and as described above, some processing may be omitted, the contents of some processing may be changed, or new processing may be added.

The functions of the elements disclosed in the present specification can be executed using a circuit or a processing circuitry including a general-purpose processor, a dedicated processor, an integrated circuit, application specific integrated circuits (ASIC), a conventional circuit, and/or a combination thereof configured or programmed to execute the disclosed functions. The processor includes a transistor and other circuits, and thus the processor is regarded as a processing circuitry or a circuit. In the present disclosure, the circuit, the unit, or the means are hardware that executes the listed functions or hardware that is programmed to execute the listed functions. The hardware may be the hardware disclosed in the present specification, or may be other known hardware configured or programmed to execute the listed functions. When the hardware is a processor considered as a kind of circuit, the circuit, the means, or the unit is a combination of hardware and software, and the software is used for the hardware and/or processor.

What is claimed is:

1. A behavior estimation device configured to analyze a behavior of a saddle-type vehicle including a vehicle body, a drive source, an operating element configured to receive an operation of a driver, and a grounded traveling body configured to travel using a driving force generated by the drive source, the behavior estimation device comprising:

a receiving device configured to receive an output instruction value of the drive source which changes in accordance with an operation amount of the operating element and a rotational speed of the drive source, the output instruction value and the rotational speed being detected by a sensor provided in the saddle-type vehicle during traveling of the saddle-type vehicle; and a processing device configured to estimate whether the grounded traveling body is in a grounded state in which the grounded traveling body is in contact with a road surface or in a jump state in which the grounded traveling body is separated from the road surface based on the output instruction value and the rotational speed received by the receiving device, wherein the processing device is configured to:

calculate a temporal change of the output instruction value; and estimate whether the grounded traveling body is in the grounded state or in the jump state based on determination that the temporal change is a characteristic temporal change occurring before and after a jump of the saddle-type vehicle.

2. The behavior estimation device according to claim 1, wherein the processing device receives time-series data of the output instruction value and the rotational speed from the receiving device, and outputs time-series data of an estimation result indicating whether the saddle-type vehicle is in the grounded state or the jump state.

3. The behavior estimation device according to claim 1, wherein the grounded state includes:

a pre-jump grounded state indicating a state in which the grounded traveling body is in contact with the ground and is in a middle of transitioning to the jump state;

a landing state indicating a state in which the grounded traveling body is in contact with the ground and lands from the jump state; and a normal grounded state indicating a state in which the grounded traveling body is in contact with the ground and that is other than the pre-jump grounded state and the landing state, and the processing device estimates which of the pre-jump grounded state, the landing state, the normal grounded state, and the jump state corresponds to.

4. The behavior estimation device according to claim 1, wherein the processing device further estimates whether the saddle-type vehicle is in the grounded state or the jump state based on a vehicle speed and a front-rear acceleration, which are detected by the sensor provided in the saddle-type vehicle during the traveling of the saddle-type vehicle.

5. The behavior estimation device according to claim 4, wherein the processing device calculates a vehicle speed and a front-rear acceleration of the saddle-type vehicle based on time-series data of position information of the saddle-type vehicle.

6. The behavior estimation device according to claim 5, wherein the receiving device receives the time-series data of the position information of the saddle-type vehicle from a GNSS sensor serving as the sensor.

7. The behavior estimation device according to claim 1, wherein the processing device causes a display device to display information in which an estimation result as to whether the saddle-type vehicle is in the grounded state or the jump state is superimposed on a map based on position information of the saddle-type vehicle and the estimation result.

8. The behavior estimation device according to claim 1, wherein the processing device applies an estimation model in which the output instruction value and the rotational speed are input and an estimation result indicating whether the saddle-type vehicle is in the grounded state or the jump state is output, and the estimation model is created by learning a feature based on the output instruction value, a feature based on the rotational speed, and correct data indicating whether the saddle-type vehicle is in the grounded state or the jump state in a case of a combination of the features as training data.

9. The behavior estimation device according to claim 8, wherein the processing device receives time-series data of the output instruction value and the rotational speed from the receiving device, and the processing device performs processing of matching sampling rates of the output instruction value and the rotational speed by down-sampling the time-series data of at least one of the output instruction value and the rotational speed, and then inputs processing result to the estimation model.

10. The behavior estimation device according to claim 8, wherein the training data includes data detected when the saddle-type vehicle travels along a plurality of traveling paths.

11. The behavior estimation device according to claim 1, wherein the saddle-type vehicle is a motorcycle traveling on an unpaved road.

12. The behavior estimation device according to claim 1, wherein the processing device is configured to estimate whether the grounded traveling body is in the grounded state or in the jump state based on determination of a temporal change of the output instruction value in which the output instruction value decreases from a large value to zero and thereafter changes again from zero to a large value during traveling of the saddle-type vehicle.

13. The behavior estimation device according to claim 1, wherein the processing device is configured to estimate whether the grounded traveling body is in the grounded state or in the jump state based on a correlation between the output instruction value and the rotational speed.

14. The behavior estimation device according to claim 13, wherein the processing device is configured to:

calculate a temporal change of the output instruction value; and estimate whether the grounded traveling body is in the grounded state or in the jump state based on determination that the temporal change is a characteristic temporal change occurring before and after a jump of the saddle-type vehicle, and a correlation between the output instruction value and the rotational speed.

15. The behavior estimation device according to claim 14, wherein the correlation includes a correlation in which a load generated on the drive source in the jump state is smaller than the load generated on the drive source in the grounded state.

16. The behavior estimation device according to claim 14, wherein the correlation includes a correlation in which an increase amount in the rotational speed corresponding to an increase amount of the output instruction value in the jump state is greater than the increase amount in the rotational speed corresponding to the increase amount of the output instruction value in the grounded state.

17. A behavior estimation method for causing a computer to analyze a behavior of a saddle-type vehicle including a vehicle body, a drive source, a sensor configured to detect an instructed amount of a change in output of the drive source by a driver, and a grounded traveling body that is in contact with a road surface and travels by a driving force generated by the drive source, the behavior estimation method comprising:

receiving the instructed amount of the change in output of the drive source detected by the sensor during the traveling of the saddle-type vehicle;

calculating a temporal change of the instructed amount of the change in output of the drive source; and estimating whether the grounded traveling body is in a grounded state in which the grounded traveling body is in contact with the road surface or in a jump state in which the grounded traveling body is separated from the road surface based on determination that the temporal change is a characteristic temporal change occurring before and after a jump of the saddle-type vehicle.

* * * * *